United States Patent Office 3,579,363
Patented May 18, 1971

3,579,363
PLASTICIZED RESIN COMPOSITIONS
James K. Sears, Webster Groves, Mo., assignor to
Monsanto Company, St. Louis, Mo.
No Drawing. Filed Nov. 19, 1968, Ser. No. 777,165
Int. Cl. C08b 27/52
U.S. Cl. 106—176
23 Claims

ABSTRACT OF THE DISCLOSURE

This invention relates to the use of certain phthalimidoacetates as plasticizers for thermoplastic resins.

---

This invention relates to new and useful thermoplastic resinous compositions. In particular, this invention relates to new and improved thermoplastic resinous compositions containing certain phthalimidoacetates which improve the physical properties of the starting resin.

Normally, vinyl halide polymers such as polyvinyl chloride and copolymers thereof, which are widely employed in the plastics industry, are quite hard and brittle in nature and require the addition of substantial proportions of a plasticizer to improve their workability. Since some of the plasticizer is ordinarily retained in the plastic product, it is desirable that it posssess certain characteristics. Among these desirable characteristics is the ability of a plasticizer to impart low-temperature flexibility to the product. The plasticizer must also be of low volatility to prevent its loss by evaporation. Other desirable characteristics of a plasticizer include low water absorption and leaching. It is also desirable that the plasticizer be one which does not allow the finished product to become hard and brittle and thereby easily fractured.

It is accordingly an object of this invention to provide improved thermoplastic resinous compositions.

It is a further object of this invention to provide novel plastic compositions comprising thermoplastic resins and certain phthalimidoacetates.

A still further object is to provide new resinous compositions having desirable physical properties.

Other object and advantages of the invention will be apparent to those skilled in the art from the following detailed description and claims.

In accordance with this invention, it has been found that the above and still further objects are achieved by incorporating a thermoplastic resin and certain phthalimidoacetates.

Generally speaking, about 5 to 200 parts by weight of plasticizer can be used for each 100 parts by weight of thermoplastic resin. However, it is preferred to use from about 20 to 100 parts by weight of plasticizer per 100 parts by weight of resin.

The phthalimidoacetates of this invention are effective as plasticizers for thermoplastic resins and rubber-like materials. Examples of materials suitable for use with this invention include vinyl chloride polymers or copolymers, polyvinyl acetate, lower alkyl cellulose ethers such as methyl cellulose, ethyl cellulose, butyl cellulose and aralkyl celluose ethers such as benzyl cellulose, cellulose esters of organic acids having 2 to 4 carbon atoms such as cellulose acetate, cellulose propionate, cellulose butyrate, cellulose acetate-butyrate and cellulose acetate-propionate, vinyl aromatic resins such as polystyrene, rubbery polymers such as the copolymers of butadiene with styrene or acrylonitrile and the terpolymer of acrylonitrile, butadiene and styrene, and polymers of α-monoolefins having 2 to 10 carbon atoms such as the polymers and copolymers of ethylene, propylene, butene-1 and the like. Polymers of methyl methacrylate suitable for use in the practice of this invention include homopolymers of methyl methacrylate or copolymers with minor amounts, for example, up to 25% by weight, of another ethylenically unsaturated monomer copolymerizable therewith, for example, acrylic acid, methacrylic acid, the 1 to 4 carbon alkyl (i.e., methyl to butyl) esters of acrylic acid, the 2 to 4 carbon alkyl (i.e., ethyl, propyl and butyl) esters of methacrylic acid, vinyl acetate, acrylonitrile, various amides and styrene.

This invention is particularly applicable to halogen-containing vinyl resins. Thus, there may be employed resins derived from such vinyl compounds as vinyl chloride, vinyl chloroacetate, chlorostyrene, chlorobutadienes, etc. Said resins also include the copolymers of such vinyl compounds and other ethylenically unsaturated monomers copolymerizable therewith. Illustrative are the copolymers of a vinyl halide, such as vinyl chloride, with other monomers such as vinylidene chloride; vinyl esters of carboxylic acids, e.g., vinyl acetate, vinyl propionate, vinyl butyrate, vinyl benzoate; esters of unsaturated acids, e.g., alkyl acrylates such as methyl acrylate, ethyl acrylate, propyl acrylate, butyl acrylate, allyl acrylate, and the corresponding esters of methacrylic acid; vinyl aromatic compound, e.g., styrene ortho-chlorostyrene, para-chlorostyrene, 2,5-dichlorostyrene, 2,4-dichlorostyrene, para-ethyl styrene, vinyl naphthalene, α-methyl styrene, dienes such as butadiene and chlorobutadiene; unsaturated amides such as acrylic acid amide and acrylic acid anilide; unsaturated nitriles such as acrylic acid nitrile; esters of α,β-unsaturated carboxylic acids, e.g., the methyl, ethyl, propyl, butyl, amyl, hexyl, heptyl, octyl, allyl, metallyl and phenyl esters of maleic, crotonic, itaconic and fumaric acids and the like. It should be recognized that the halogenated resins containing halogens other than chlorine, e.g., bromine, fluorine and iodine, are also operable in this invention. The halogenated resins may contain a varying proportion of halogen, depending upon the nature of the resin and its contemplated use. Those copolymers in which a predominant portion, i.e., more than 50% by weight of the copolymer, is made from a halogen-containing vinylidene monomer such as vinyl chloride represent a preferred class of polymers to be treated according to this invention.

The phthalimidoacetates useful as plasticizers with this invention have the general formula

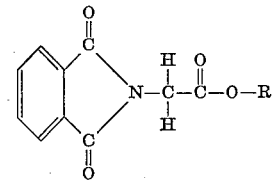

wherein R is selected from the group consisting of alkyl having 1 to 20 carbon atoms, mixed alkyl having 6 to 18 carbon atoms, cycloalkyl having 4 to 18 carbon atoms, aryl having 6 to 10 carbon atoms, aralkyl having 7 to 9 carbon atoms, alkaryl having 7 to 18 carbon atoms and alkoxyalkyl having up to 8 carbon atoms.

The alkyl and cycloalkyl radicals can be derived from many sources. For example, the alkyl radicals can be straight or branched chain radicals having up to 20 carbon atoms derived from various sources such as alcohols, including alcohols produced by the oxo synthesis or alcohols obtained by catalytic hydrogenation of coconut oil, from oxidized waxes or from esterification of a carbonyl group by reaction with an olefin. Illustrative examples of alkyl radicals are methyl, ethyl, propyl, isopropyl, n-butyl, isobutyl, sec.-butyl, tert.-butyl, n-amyl, isoamyl, n-hexyl, isohexyl, 2-ethylheptyl, 2-ethylhexyl, octyl, isooctyl, 2-octyl, isononyl, decyl, lauryl, tridecyl, tetradecyl, pentadecyl, octadecyl, crotyl, oleyl, alkyl radicals derived from $C_3$ to $C_{20}$ oxo alcohols, etc. Illustrative examples of cycloalkyl radicals are cyclobutyl, cyclopentyl, 2-methylcyclopentyl, 3-methylcyclopentyl, 2,4-dimethylcyclopentyl, cyclohexyl, 3,5-dimethylcyclohexyl, gem.-dimethylcyclohexyl, cyclohexylmethyl, cyclohexylpropyl, methylcyclohexylethyl, 2-propylcyclohexyl, 3-dodecylcyclohexyl, cycloheptyl, 2,4-dimethylcycloheptyl, 2,3,5-trimethylcycloheptyl, etc.

Illustrative examples of aryl radicals are phenyl, naphthyl, etc. Illustrative examples of aralkyl radicals are benzyl, 4-methylbenzyl, 3-phenylpropyl, phenethyl, etc. Examples of alkaryl radicals useful with the invention include methylphenyl, butylphenyl, hexylphenyl, octylphenyl, nonylphenyl, dodecylphenyl, 1-methylnaphthyl, 2-methylnaphthyl, etc. Illustrative examples of alkoxyalkyl radicals are ethoxyethyl, butoxyethyl, methoxypropyl, butoxybutyl and the like.

The mixed alkyl radicals can be derived from mixtures of straight chain aliphatic alcohols having between 6 and about 18 carbon atoms. These are represented by the alcohols marketed by Continental Oil Company under the trade name Alfol 610, Alfol 810, Alfol 1214, Alfol 1216 and Alfol 1618 and alcohols marketed by Archer Daniels Midland Company under the trade name Adol 9, Adol 12, Adol 52 and Adol 63. Alfol 610 is a mixture of saturated straight chain hydrocarbon monohydric alcohols having the following approximate composition: 20% $C_6$ alcohols, 35% $C_8$ alcohols and 44% $C_{10}$ alcohols. Alfol 810 consists primarily of 43% $C_8$ alcohols and 55% $C_{10}$ alcohols. Alfol 1214 comprises approximately 55% $C_{12}$ alcohols and 43% $C_{14}$ alcohols. Alfol 1216 has a composition approximating 63% $C_{12}$ alcohols, 24% $C_{14}$ alcohols, 10% $C_{16}$ alcohols and Alfol 1618 has 63% $C_{16}$ alcohols, 30% $C_{18}$ alcohols and 2% $C_{20}$ alcohols. Adol 9 is a mixture of straight chain fatty alcohols having the following approximate composition: 55% $C_8$ alcohols, 35% $C_{10}$ alcohols and 10% $C_{12}$ alcohols. Adol 12 consists primarily of 2% $C_{10}$ alcohols, 90% $C_{12}$ alcohols and 8% $C_{14}$ alcohols. Adol 52 has an approximate composition of 4% $C_{14}$ alcohols, 90% $C_{16}$ alcohols and 6% $C_{18}$ alcohols. Adol 63 comprises 1% $C_{12}$ alcohols, 6% $C_{14}$ alcohols, 30% $C_{16}$ alcohols, 60% $C_{18}$ alcohols and 3% $C_{22}$ alcohols.

The plasticizers of the present invention are readily prepared by methods well known in the art. For example, the phthalimidoacetates may be prepared by reacting potassium phthalimide with an ester of chloroacetic acid substantially in the manner shown in Example 1.

EXAMPLE 1

A suitable reactor is charged with 640 grams of potassium phthalimide. Approximately 500 ml. of a solution prepared from 825 grams of 2-ethylhexyl α-chloroacetate and 500 ml. of dimethyl formamide is added to the reactor and the resulting mixture is heated to a temperature of about 100° C. The remainder of the 2-ethylhexyl α-chloroacetate and dimethyl formamide solution is then added over a period of about one hour during which time the temperature is maintained in a range of from about 100° C. to 110° C. The reaction mixture is held at the aforementioned temperature range for an additional two hours, and the resulting product is vacuum stripped at a pressure of 20 mm. (Hg, abs.). The reaction product is then washed with several water and aqueous sodium bicarbonate washes, vacuum steamed at 130° C. and 30 mm. (Hg, abs.) and filtered. A yield of 1015 grams of 2-ethylhexyl phthalimidoacetate is obtained.

The invention will be more readily understood by reference to the following examples which describe the advantageous and unexpected results achieved by the use of the plasticizers of the present invention in thermoplastic resins. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

The following testing procedures are used in evaluating the physical properties and efficiency of plasticizers.

Compatibility.—Visual inspection of the plasticized composition is employed, incompatibility of the plasticizer with the polymer being demonstrated by cloudiness and exudation of the plasticizer.

Low-temperature flexibility.—Low-temperature flexibility is one of the most important properties of elastomeric vinyl compositions. While many plasticizers will produce flexible compositions at room temperature, the flexibility of these compositions at low temperature may vary considerably, i.e., plasticized polyvinyl chloride compositions that are flexible at room temperature often become very brittle and useless at lower temperatures. Low-temperature flexibility tests herein employed are according to the Clash-Berg Method. This method determines the torsional flexibility of a plastic at various temperatures. The temperature at which the vinyl composition exhibits an arbitrarily established minimum flexibility is defined as the low-temperature flexibility of the composition. This value may also be defined as the lower temperature limit of the plasticized compositions usefulness as an elastomer.

Kerosene extraction.—Resistance to kerosene is measured as follows: A 2″ diameter 40 mil. disc is suspended in a 50° C. oven for a 3-hour conditioning period to eliminate water, then cooled and weighed. The conditioned sample is then immersed in 400 ml. of kerosene for a period of 24 hours at 23° C. The sample is then removed from kerosene, blotted dry and suspended in a force draft 80° C. oven for 4 hours. The sample is then cooled and weighed. The percent loss in weight is reported as the kerosene extraction value.

Water resistance.—The amount of water absorption and the amount of water leaching that take place when the plasticized composition is immersed in distilled water for 24 hours is determined.

Hardness.—A standard instrument made by Shore Instrument Company is used for this determination and expresses the hardness in units from 1 to 100. The hardness of the composition is judged by its resistance to the penetration of a standard needle applied to the composition under a standard load for a standard length of time.

The following examples illustrate the advantageous and unexpected results which are achieved by the use of the plasticizers of the present invention in thermoplastic resinous compositions but it is not intended that this invention be limited by or to such examples.

EXAMPLE 2

One hundred parts by weight of polyvinyl chloride and 40 parts by weight of 2-ethylhexyl phthalimidoacetate are mixed on a rolling mill to a homogeneous blend. During the milling, substantially no fuming or discoloration is observed. Testing of the molded sheet for low-temperature flexibility, according to the procedure described above, gives a value of −17.3° C., which value denotes good low-temperature properties. Tests of the water resistance of the plasticized material show a loss of soluble matter of 0.09% and a water absorption value of 0.49%. Shore A hardness value of 71 is obtained on this composition. The plasticized material has a kerosene extraction value of 1.6%.

EXAMPLE 3

Following the procedure of Example 2, the 2-ethylhexyl phthalimidoacetate plasticizer is replaced with 40 parts by weight of the following plasticizers: N-methyl phthalimidoacetate, N-ethyl phthalimidoacetate; N - propyl phthalimidoacetate, N - isopropyl phthalimidoacetate, N - butyl phthalimidoacetate, N - isobutyl phthalimidoacetate, N - amyl phthalimidoacetate, N - isoamyl phthalimidoacetate, N - hexyl phthalimidoacetate, N - isohexyl phthalimidoacetate, N - heptyl phthalimidoacetate, N- octyl phthalimidoacetate, N - nonyl phthalimidoacetate, N-decyl phthalimidoacetate, N - dodecyl phthalimidoacetate, N - tridecyl phthalimidoacetate, N-octadecyl phthalimidoacetate, N-(C$_8$-C$_{10}$ alkyl) phthalimidoacetate, N-(C$_8$-C$_{10}$ alkyl) phthalimidoacetate, N-(C$_{12}$-C$_{14}$ alkyl) phthalimidoacetate, N-cyclobutyl phthalimidoacetate, N-cyclopentyl phthalimidoacetate, N - cyclohexyl phthalimidoacetate, N - phenyl phthalimidoacetate, N - naphthyl phthalimidoacetate, N - benzyl phthalimidoacetate, N-phenethyl phthalimidoacetate, N-methylphenyl phthalimidoacetate, N - nonylphenyl phthalimidoacetate, N-2-methylnaphthyl phthalimidoacetate, N - ethoxymethyl phthalimidoacetate, N - methoxybutyl phthalimidoacetate, N - butoxypropyl phthalimidoacetate, N - methoxymethyl phthalimidoacetate, N - propoxypropyl phthalimidoacetate and N-butoxybutyl phthalimidoacetate.

The plasticized resin compositions exhibit physical properties similar to those demonstrated in Example 2.

Similar results are obtained when the above phthalimidoacetates are compared at levels of 20, 30, 60 and 75 phr. (parts of plasticizer per hundred parts by weight of resin).

The substitution of other vinyl halide-containing resins for the polyvinyl chloride used in the examples, also results in effective plasticization. Similar improved compositions are obtained when the polyvinyl chloride is replaced by an equivalent amount of a copolymer of 95 parts of vinyl chloride and 5 parts of vinyl acetate, a copolymer of 90 parts of vinyl chloride and 10 parts of vinylidene chloride and a copolymer of 70 parts of vinyl chloride and 30 parts of diethylmaleate.

EXAMPLE 4

Individual plasticized compositions are prepared in accordance with the procedure of Example 2 wherein the polyvinyl chloride is replaced in each instance by 100 parts by weight of polymethyl acrylate, 100 parts by weight of polymethyl methacrylate, 100 parts by weight of a copolymer of 98 parts of methyl methacrylate and 2 parts of methacrylic acid, 100 parts by weight of a copolymer of 80 parts of methyl methacrylate and 20 parts of glycidyl methacrylate, and 100 parts by weight of a copolymer of 70 parts of methyl methacrylate and 30 parts of methyl acrylate. In each instance, the results parallel those obtained in the second example.

EXAMPLE 5

Samples of cellulose acetate, cellulose propionate, cellulose acetate butyrate, cellulose nitrate, methyl cellulose, ethyl cellulose, butyl cellulose and benzyl cellulose are mixed on a rolling mill to a homogeneous blend with 20 parts by weight of 2-ethylhexyl phthalimidoacetate per 100 parts by weight of each thermoplastic resin. The resultant products are pressed into films and are found to be more flexible than films obtained from the thermoplastic resins in the absence of the plasticizer.

EXAMPLE 6

The procedure of Example 2 is repeated except that the polyvinyl chloride is replaced by 100 parts by weight of individual resins, namely, polyethylene, polypropylene, polyvinyl acetate, polystyrene, a coplymer of 40 parts of styrene and 60 parts of acrylonitrile and a coplymer of 70 parts of styrene and 30 parts of acrylonitrile. In each instance, the plasticized resin compositions exhibit physical properties comparable to those demonstrated in the previous examples.

The phthalimidoacetates of the present invention may be employed as the sole plasticizer in resin compositions or may be used in combination with other known conventional plasticizers or softening agents commonly employed with such resins. Illustrative of the latter plasticizers are diethyl phthalate, dibutyl phthalate, di-2-ethylhexyl phthalate, dibutyl sebacate, triethyl phosphate, trioctyl phosphate and methyl phthalyl ethylglycolate.

For many purposes, it may be desirable to blend other conventional additives with the plasticized thermoplastic resinous compositions of the present invention. Illustrative of such additives are fillers, dyes, pigments, heat and light stabilizers, lubricants and the like. It will be apparent that compositions containing such other additives are within the scope of this invention.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A composition of matter comprising a thermoplastic resin and a compound having the general formula

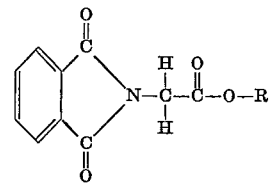

wherein R is selected from the group consisting of alkyl having 1 to 20 carbon atoms, mixed alkyl having 6 to 18 carbon atoms, cycloalkyl having 4 to 18 carbon atoms, aryl having 6 to 10 carbon atoms, aralkyl having 7 to 9 carbon atoms, alkaryl having 7 to 18 carbon atoms and alkoxyalkyl having up to 8 carbon atoms, wherein said compound is present in amounts of from about 5 to about 200 parts by weight per 100 parts by weight of said thermoplastic resin.

2. A composition as defined in claim 1 wherein R is alkyl having 4 to 12 carbon atoms.

3. A composition as defined in claim 1 wherein said compound is 2-ethylhexyl phthalimidoacetate.

4. A composition as defined in claim 1 wherein said compound is present in amounts of from about 20 to about 100 parts by weight per 100 parts by weight of said thermoplastic resin.

5. A composition as defined in claim 1 wherein said thermoplastic resin is a vinyl halide polymer selected from the group consisting of polymerized vinyl halide monomers and copolymers of such monomers with an ethylenically unsaturated monomer, at least 50% of the monomer units of said copolymers being vinyl halide units.

6. A composition as defined in claim 1 wherein said thermoplastic resin is a vinyl halide polymer selected from the group consisting of polymerized vinyl halide monomers and copolymers of such monomers with an ethylenically unsaturated monomer, at least 50% of the monomer units of said copolymers being vinyl halide units and R is alkyl having 4 to 12 carbon atoms.

7. A composition as defined in claim 1 wherein said thermoplastic resin is a vinyl halide polymer selected from the group consisting of polymerized vinyl halide monomers and copolymers of such monomers with an ethylenically unsaturated monomer, at least 50% of the monomer units of said copolymers being vinyl halide units and said compounds is 2-ethylhexyl-phthalimidoacetate.

8. A composition as defined in claim 1 wherein said thermoplastic resin is polyvinyl chloride and said compound is 2-ethylhexyl phthalimidoacetate.

9. A composition as defined in claim 1 wherein said thermoplastic resin is a polymer of an α-monoolefin having 2 to 10 carbon atoms.

10. A composition as defined in claim 1 wherein said thermoplastic resin is a polymer of an α-monoolefin having 2 to 10 carbon atoms and R is alkyl having 4 to 12 carbon atoms.

11. A composition as defined in claim 1 wherein said thermoplastic resin is a cellulose ester of an organic acid having 2 to 4 carbon atoms.

12. A composition as defined in claim 1 wherein said thermoplastic resin is a cellulose ester of an organic acid having 2 to 4 carbon atoms and R is alkyl having 4 to 12 carbon atoms.

13. A composition as defined in claim 1 wherein said thermoplastic resin is a cellulose ester of an organic acid having 2 to 4 carbon atoms and said compound is 2-ethylhexyl phthalimidoacetate.

14. A composition as defined in claim 1 wherein said thermoplastic resin is a cellulose ether selected from the group consisting of lower alkyl cellulose ethers and aralkyl cellulose ethers.

15. A composition as defined in claim 14 wherein said cellulose ether is ethyl cellulose.

16. A composition as defined in claim 14 wherein said cellulose ether is butyl cellulose.

17. A composition as defined in claim 14 wherein said cellulose ether is benzyl cellulose.

18. A composition as defined in claim 1 wherein said thermoplastic resin is a cellulose ether selected from the group consisting of lower alkyl cellulose ethers and aralkyl cellulose ethers and R is alkyl having 4 to 12 carbon atoms.

19. A composition as defined in claim 1 wherein said thermoplastic resin is a polymer of methyl methacrylate selected from the group consisting of homopolymers of methyl methacrylate and copolymers of methyl methacrylate containing at least 75% methyl methacrylate and up to 25% of an ethylenically unsaturated monomer copolymerizable therewith.

20. A composition as defined in claim 1 wherein said thermoplastic resin is a polymer of methyl methacrylate selected from the group consisting of homopolymers of methyl methacrylate and copolymers of methyl methacrylate containing at least 75% methyl methacrylate and up to 25% of an ethylenically unsaturated monomer copolymerizable therewith and R is alkyl having 4 to 12 carbon atoms.

21. A composition as defined in claim 1 wherein said thermoplastic resin is a polymer of methyl methacrylate selected from the group consisting of homopolymers of methyl methacrylate and copolymers of methyl methacrylate containing at least 75% methyl methacrylate and up to 25% of an ethylenically unsaturated monomer copolymerizable therewith and said compound is 2-ethylhexyl phthalimidoacetate.

22. A composition as defined in claim 1 wherein said theromplastic resin is polymethyl methacrylate.

23. A composition as defined in claim 1 wherein said thermoplastic resin is a copolymer of from about 40 to about 70 parts of styrene and from about 30 to about 60 parts of acrylonitrile.

References Cited
UNITED STATES PATENTS

| | | | |
|---|---|---|---|
| 2,824,016 | 2/1958 | Cornwell | 106—186 |
| 2,546,220 | 3/1951 | Fryling | 260—88.7 |
| 2,425,288 | 8/1947 | Tryon | 260—326 |

MORRIS LIEBMAN, Primary Examiner

T. MORRIS, Assistant Examiner

U.S. Cl. X.R.

260—30.2, 32.6